United States Patent
Taki

(10) Patent No.: US 8,605,733 B2
(45) Date of Patent: Dec. 10, 2013

(54) METHOD OF DATA TRANSMISSION, DATA TRANSMITTING APPARATUS, AND NETWORK SYSTEM

(75) Inventor: Nobuhiro Taki, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 170 days.

(21) Appl. No.: 12/976,068

(22) Filed: Dec. 22, 2010

(65) Prior Publication Data

US 2011/0158243 A1   Jun. 30, 2011

(30) Foreign Application Priority Data

Dec. 24, 2009 (JP) ................. 2009-292233

(51) Int. Cl.
*H04L 12/56* (2011.01)

(52) U.S. Cl.
USPC .......................................................... 370/400

(58) Field of Classification Search
USPC ............... 370/254–430; 709/201–213
See application file for complete search history.

(56) References Cited

U.S. PATENT DOCUMENTS

2003/0202539 A1* 10/2003 Fukunaga et al. ............ 370/489

FOREIGN PATENT DOCUMENTS

| JP | 10-023101 A | 1/1998 |
|---|---|---|
| JP | 2001-156813 A | 6/2001 |
| JP | 2005-5863 A | 1/2005 |
| JP | 2005-167800 A | 6/2005 |
| JP | 2006-254499 A | 9/2006 |

OTHER PUBLICATIONS

"IEEE Std 1394-2008 Standard for a High-Performance Serial Bus", Oct. 21, 2008, Revision of IEEE Std 1394-1995 New York, NY.*

IEEE Standard for High Performance Serial Bus—IEEE Std 1394-2008 (Revision 04 IEEE Std 1394-1995), Oct. 21, 2008, IEEE 3 Park Ave. New York, NY 10016-5997 USA.*

* cited by examiner

*Primary Examiner* — Ayaz Sheikh
*Assistant Examiner* — Debebe Asefa
(74) *Attorney, Agent, or Firm* — Sterne, Kessler, Goldstein & Fox P.L.L.C.

(57) ABSTRACT

A method of data transmission that includes: transmitting first data to be transferred in a synchronous packet using a second asynchronous packet having priority higher than that of a first asynchronous packet; and requesting transmission of second data following the first data using the second asynchronous packet after a lapse of a certain time from the transmission of the second asynchronous packet.

14 Claims, 9 Drawing Sheets

FIG. 6

| DESTINATION_ID | TL | RT | TCODE | PRI |
|---|---|---|---|---|
| SOURCE_ID | | | | |
| DESTINATION_OFFSET | | | | |
| CYCLE_TIME_DATA | | | | |
| HEADER_CRC | | | | |

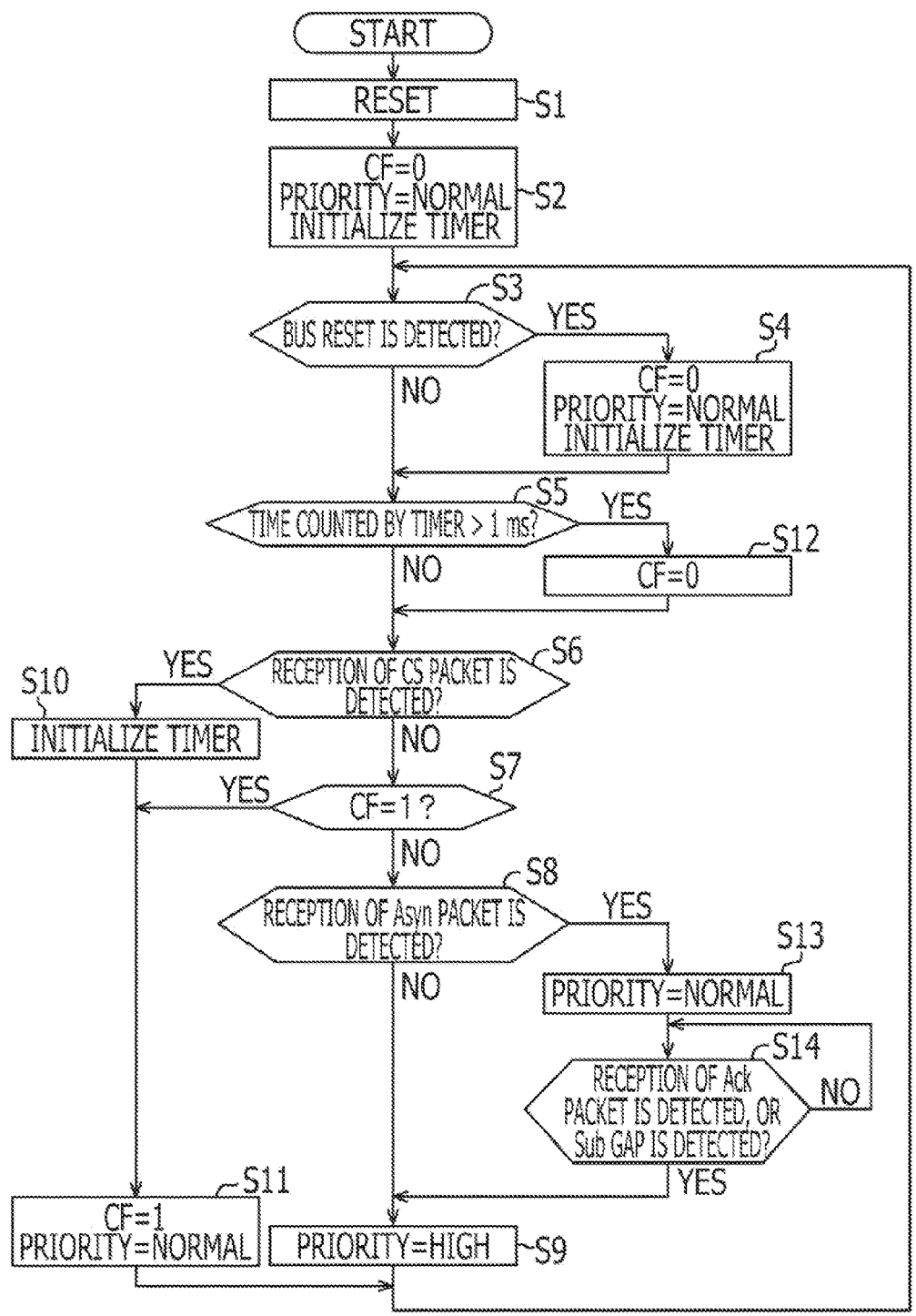

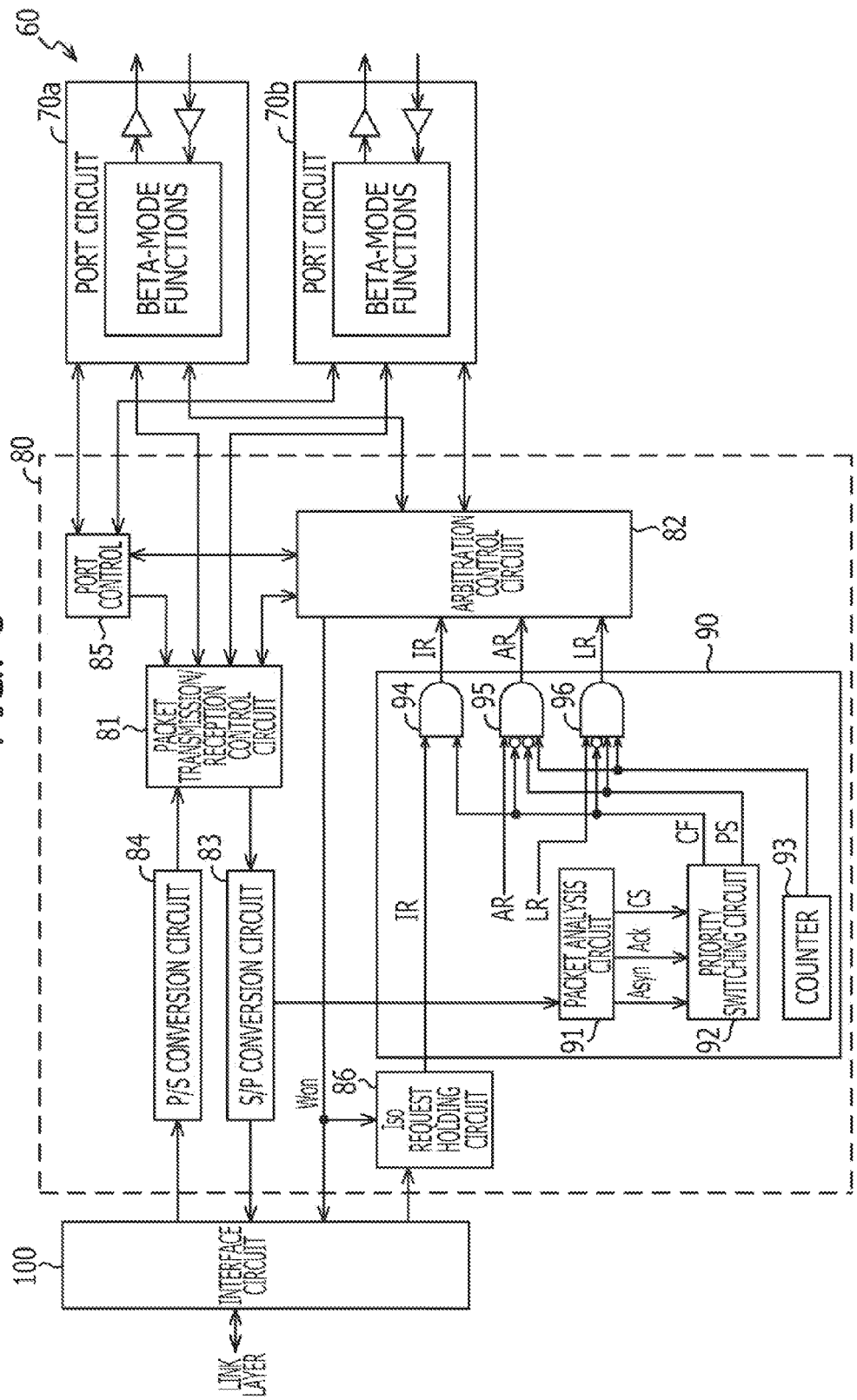

METHOD OF DATA TRANSMISSION, DATA TRANSMITTING APPARATUS, AND NETWORK SYSTEM

CROSS-REFERENCE TO RELATED APPLICATIONS

This application claims the benefit of priority from Japanese Patent Application No. 2009-292233 filed on Dec. 24, 2009, the entire contents of which are incorporated herein by reference.

BACKGROUND

1. Field

The embodiments discussed herein relate to a method of data transmission, a data transmitting apparatus, and a network system.

2. Description of Related Art

The IEEE 1394 protocol having real-time performance may be used for a transfer of video data or audio data. The IEEE 1394 protocol includes an isochronous (hereinafter, abbreviated to "Iso") transfer mode in which data is transferred every certain period, e.g., 125 μs.

Related arts are disclosed in, for example, Japanese Laid-open Patent Publication Nos. H10-023101, 2001-156813, and 2005-167800.

SUMMARY

According to one aspect of the embodiments, a method of data transmission, includes: transmitting first data to be transferred using a synchronous packet using a second asynchronous packet having priority higher than that of a first asynchronous packet; and requesting transmission of second data following the first data using the second asynchronous packet after a lapse of a certain time from the transmission of the second asynchronous packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 illustrates an exemplary cycle start packet;
FIG. 7 illustrates an exemplary method of switching between priority levels;
FIG. 9 illustrates an exemplary IEEE 1394 protocol controller.

DESCRIPTION OF EMBODIMENTS

Figure 1:
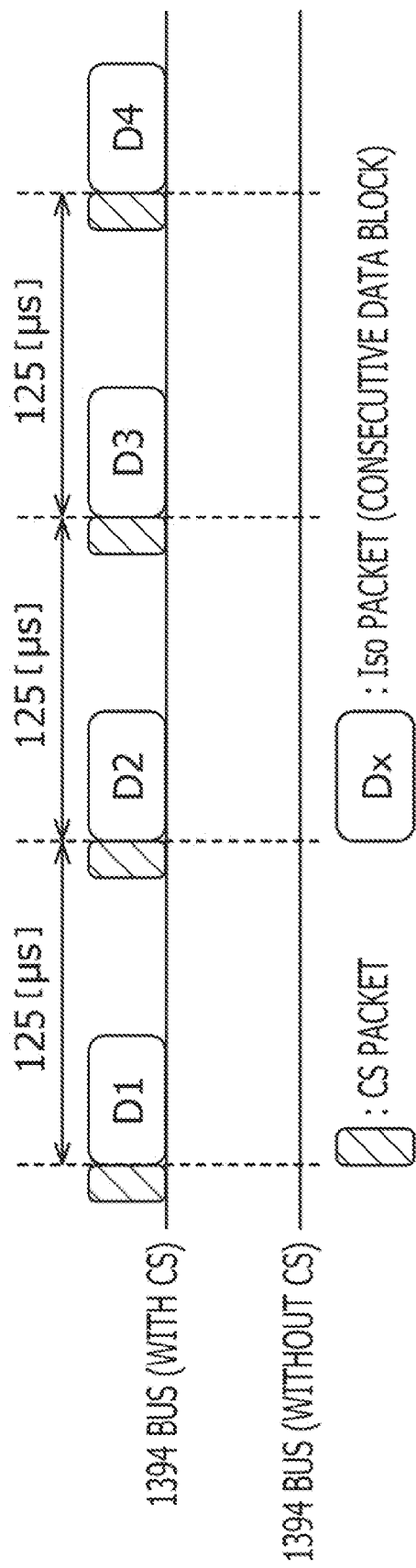
FIG. 1 illustrates an exemplary Iso transfer.

FIG. 1 illustrates an exemplary Iso transfer. The Iso transfer is performed during certain periods. For example, FIG. 1 illustrates a transfer every substantially certain period, e.g., 125 μs is, as indicated by dashed lines. Hereinafter, a "substantially certain period" is referred to as a certain period. The transfer time may be refereed as an "isochronous (Iso) cycle". The Iso cycles may be separated by cycle start (CS) packets at regular intervals of 125 μs is, for example.

All video or audio data to be transferred may not be in a single Iso packet during a single Iso cycle. For example, in the Iso transfer mode, data is divided into a plurality of data blocks each having a certain size and the data is transferred as a series of consecutive data blocks over a plurality of Iso cycles. In the Iso transfer mode, prior to data transfer, a band for Iso-cycle data transfer is allocated to a node at which Iso transfer is performed. Therefore, in the Iso transfer mode, a consecutive data block is transferred every certain period, irrespective of the state of a bus.

In the Iso transfer mode, a cycle master node in a topology issues synchronization data indicating a start of an Iso cycle, for example, a CS packet. Each node which has received the CS packet performs time adjustment. The node to which the band is allocated waits for an isochronous (Iso) gap, outputs a bus request to start arbitration, acquires a right to use the bus (hereinafter, referred to as "bus use right"), and then transmits a consecutive data block D1 using an Iso packet.

After a lapse of a certain period, e.g., 125 μs is, from the time when the CS packet is generated, the cycle master node issues a CS packet indicating the start of the next Iso cycle. The above-described operation from the output of a bus request to the transfer of a packet is repeated. A series of consecutive data blocks (D1 to D4) are transferred as Iso packets every certain period.

The CS packet is used to specify a transfer cycle and does not transfer video data or the like. Accordingly, the performance of a 1394 bus based on a bit rate at which video data is transferred may decrease.

Figure 2:
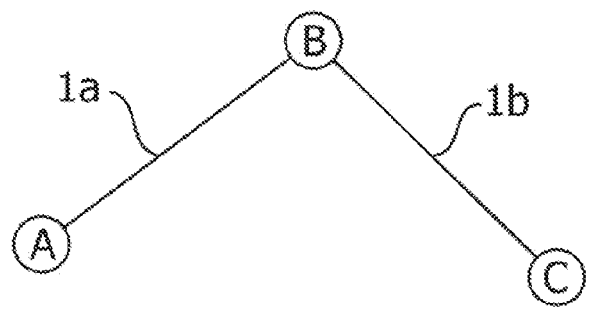
FIG. 2 illustrates an exemplary system.

FIG. 2 illustrates an exemplary system. The system, e.g., the topology in FIG. 2 may conform to IEEE Std 1394-1995 Standard or IEEE Std 1394a-2000 Standard. A node A is coupled to a node B via a bus cable 1a. The node B is coupled to a node C via a bus cable 1b. Each of the nodes A to C may include, for example, a personal computer, a printer, or a digital camera.

Figure 3:
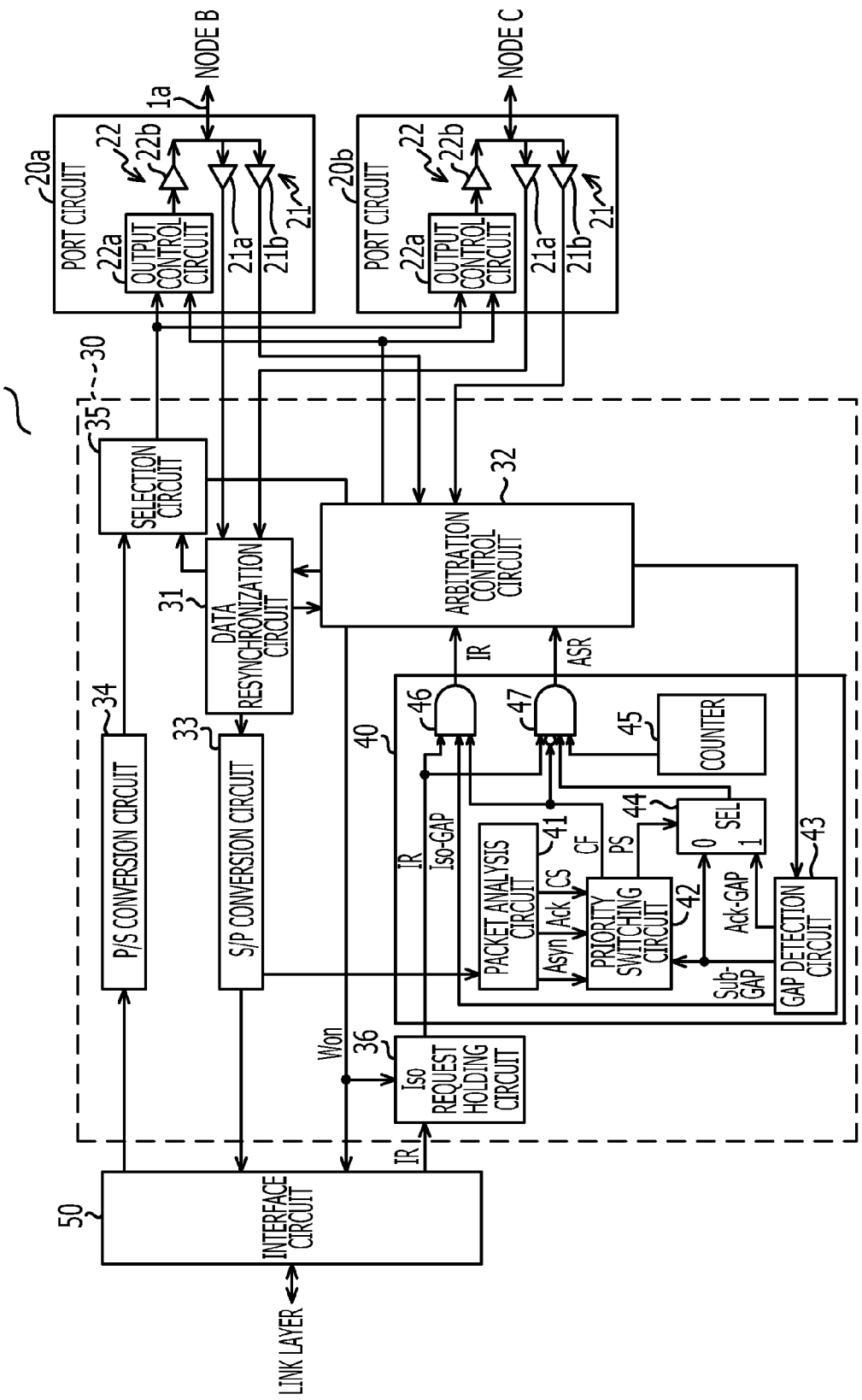
FIG. 3 illustrates an exemplary IEEE 1394 protocol controller.

FIG. 3 illustrates an exemplary IEEE 1394 protocol controller (IPC). The IPC 10 in FIG. 3 may conform to IEEE Std 1394-1995 Standard or IEEE Std 1394a-2000 Standard. Each of the nodes A, B, and C may include the IPC 10.

The IPC 10 includes port circuits 20a and 20b, a physical layer control circuit 30, and an interface circuit 50. The port circuit 20a includes a reception circuit 21 and a transmission circuit 22. The reception circuit 21 is coupled to another node, for example, the node B via the bus cable 1a, receives an electrical signal from the node B, converts the received signal to an electrical signal to be handled in an apparatus, and outputs the electrical signal to the physical layer control circuit 30. The reception circuit 21 includes receiver circuits 21a and 21b. The receiver circuit 21a outputs packet data, for example, an Iso packet received from the node B to a data resynchronization circuit 31 of the physical layer control circuit 30. The receiver circuit 21b outputs an arbitration signal received from the node B to an arbitration control circuit 32 of the physical layer control circuit 30.

The transmission circuit 22 converts an electrical signal supplied from the physical layer control circuit 30 to an electrical signal according to IEEE Std 1394-1995 Standard or IEEE Std 1394a-2000 Standard and transmits the electrical signal to the receiver circuit 21 of the node B. The transmission circuit 22 includes an output control circuit 22a and a driver circuit 22b. The output control circuit 22a selects either one of packet data, such as an Iso packet, supplied from the physical layer control circuit 30 and an arbitration control signal supplied from the arbitration control circuit 32 and outputs the selected signal to the node B through the driver circuit 22b. The configuration of the port circuit 20b may be substantially the same as or similar to that of the port circuit 20a.

The physical layer control circuit 30 monitors the state of the corresponding bus, initializes the bus state when a bus reset occurs, performs speed signaling, performs arbitration, or performs encoding/decoding for data transmission/reception. As for arbitration, for example, when a plurality of nodes contemporaneously perform data communication, arbitration is performed so as to inhibit and/or avoid contention between processes.

The physical layer control circuit 30 includes the data resynchronization circuit 31, the arbitration control circuit 32, a serial-to-parallel (S/P) conversion circuit 33, a parallel-to-serial (P/S) conversion circuit 34, a selection circuit 35, an isochronous (Iso) request holding circuit 36, and a request generation circuit 40.

The data resynchronization circuit 31 converts received packet data from each receiver circuit 21a to a logic signal to be handled in the link layer in response to a control signal from the arbitration control circuit 32 and outputs the logic signal to the S/P conversion circuit 33. The data resynchronization circuit 31 outputs the received packet data as repeat data for repeat transfer to the selection circuit 35. The data resynchronization circuit 31 outputs an ending signal indicating an end of the received packet to the arbitration control circuit 32.

The S/P conversion circuit 33 converts the logic signal, e.g., serial data supplied from the data resynchronization circuit 31 to parallel data and outputs the data to the link layer through the interface circuit 50. The P/S conversion circuit 34 converts a logic signal, e.g., parallel data supplied from the link layer through the interface circuit 50 to serial data and outputs the data, serving as transmission packet data, to the selection circuit 35.

The selection circuit 35 selects either of the transmission packet data supplied from the P/S conversion circuit 34 and the repeat data supplied from the data resynchronization circuit 31 in accordance with a selection signal supplied from the arbitration control circuit 32 and outputs the selected data to each output control circuit 22a.

The arbitration control circuit 32 may correspond to a main controller for the physical layer. The arbitration control circuit 32 is supplied with an arbitration signal from each receiver circuit 21b, an Iso request IR from the request generation circuit 40, an A-Stream request ASR, or an ending signal from the data resynchronization circuit 31. The arbitration control circuit 32 responds to an arbitration request, for example, a transmission request signal from the link layer based on an input signal, controls the port circuits 20a and 20b, resets the bus, or performs configuration. The arbitration control circuit 32 outputs a signal Won indicating that the corresponding node is designated by arbitration to the interface circuit 50 and the Iso request holding circuit 36. The link layer starts transmission of transmission data to the P/S conversion circuit 34 based on the signal Won. When detecting that the bus is in an idle state, the arbitration control circuit 32 outputs an idle detection signal to a gap detection circuit 43 in the request generation circuit 40.

The Iso request holding circuit 36 holds the Iso request IR supplied from the link layer through the interface circuit 50 and outputs the Iso request IR to the request generation circuit 40. The Iso request IR may correspond to a transmission request signal to request transmission of an Iso packet. The Iso request IR may be a bus request to request a right to use a communication path for transferring data, such as a bus when consecutive data blocks, such as video data, are transferred using Iso packets.

The request generation circuit 40 generates an asynchronous stream (A-Stream) request ASR based on the Iso request IR. The A-Stream request ASR may be a bus request (transmission request signal) for requesting a bus use right for transfer of an A-Stream packet which is asynchronous data. Consecutive data blocks, such as audio data, are transferred by A-Stream packets corresponding to asynchronous data. The request generation circuit 40 generates the A-Stream request ASR so that the arbitration priority of an A-Stream packet is higher than that of an asynchronous (Asyn) packet. The request generation circuit 40 generates the A-Stream request ASR every certain period, e.g., 125 µs is. Accordingly, a consecutive data block is transferred every certain period without using any CS packet.

The request generation circuit 40 includes a packet analysis circuit 41, a priority switching circuit 42, the gap detection circuit 43, a selection circuit 44, AND circuits 46 and 47, as well as the counter 45.

Figure 4:
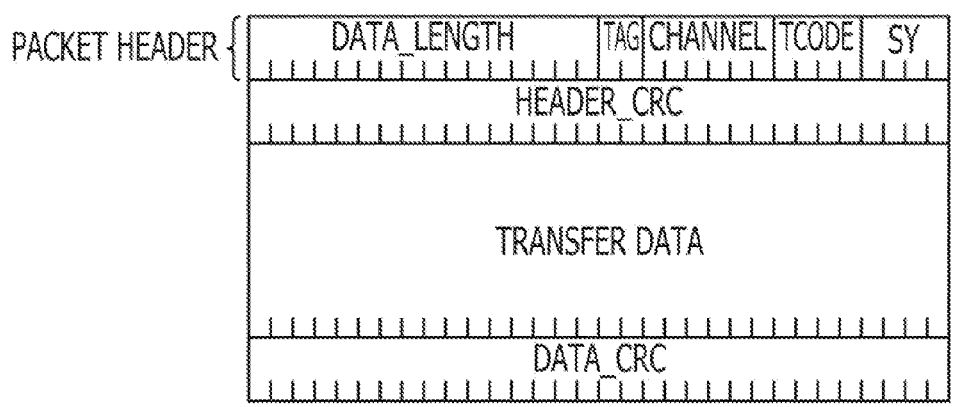
FIG. 4 illustrates an exemplary isochronous packet.

The packet analysis circuit 41 analyzes a received packet supplied from the S/P conversion circuit 33. FIG. 4 illustrates an exemplary Iso packet. In the Iso packet corresponding to a synchronous packet, for example, a packet header, a header CRC (header_CRC), and data CRC (data_CRC) are added to transfer data. The packet header includes a field "data_length" indicating the length of the transfer data, a field "tag" indicating a data format, a field "channel" indicating a channel number for the packet, a field "tcode" indicating an Iso packet, and a field "sy" indicating a synchronization code. The header CRC stores an error detecting code generated for the packet header. The data CRC stores an error detecting code generated for the transfer data.

Figure 5:
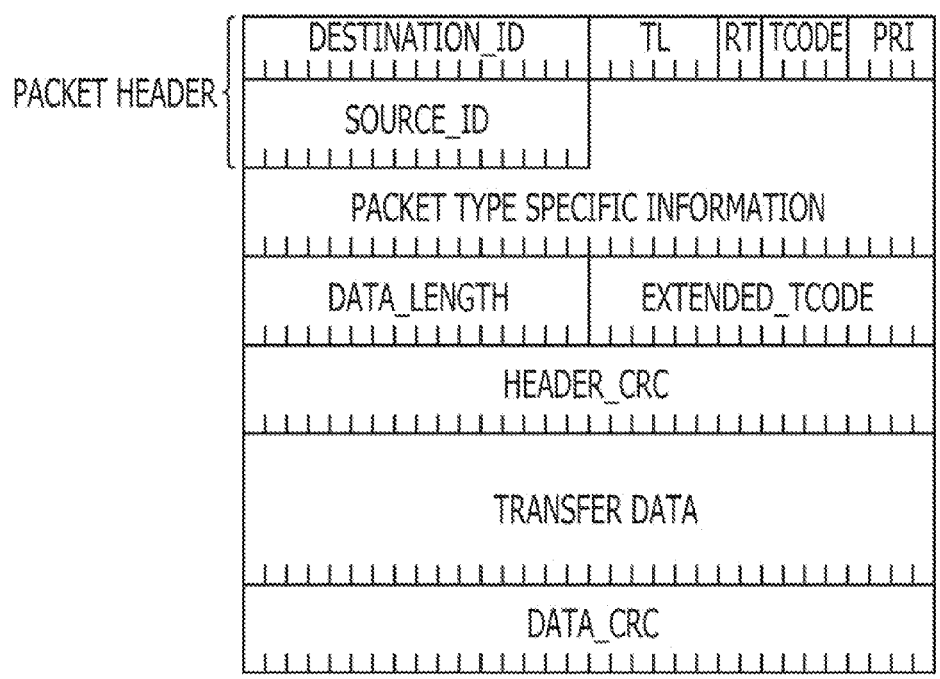
FIG. 5 illustrates an exemplary asynchronous packet.

FIG. 5 illustrates an exemplary Asyn packet. In the Asyn packet corresponding to an asynchronous packet, for example, a packet header, a header CRC, and data CRC are added to transfer data. The packet header includes a field "destination_ID" indicating the ID of a transfer destination node, a field "tl" indicating a transfer label, a field "rt" indicating a retry code, a field "tcode" indicating an Asyn packet, a field "pri" serving as a priority region, and a field "source_ID" indicating the ID of a transfer source node. The Asyn packet includes a field "packet type specific information" indicating information specific to the packet type, a field "data_length" indicating the length of the transfer data, and a field "extended_tcode" indicating the type of lock.

An A-Stream packet corresponding to an asynchronous packet may have substantially the same data format as that of the Iso packet illustrated in FIG. 4.

FIG. 6 illustrates an exemplary CS packet. The CS packet includes a packet header, data "destination_offset" indicating a standard address of a cycle timer, data "cycle_time_data" indicating cycle timer information, and a header CRC. The packet header is provided with a field "destination_ID" indicating the ID of a transfer destination node, a field "tl" indicating a transfer label, a field "rt" indicating a retry code, a field "tcode" indicating a CS packet, a field "pri" serving as a priority region, and a field "source_ID" indicating the ID of a transfer source node. The field "destination_ID" stores a value of all "1"s indicating local bus broadcast.

Referring to FIG. 3, when the packet analysis circuit 41 detects that the received packet supplied from the S/P conversion circuit 33 is an Asyn packet, the packet analysis circuit 41 outputs an Asyn detection signal to the priority switching circuit 42. When detecting that the received packet is an acknowledge (Ack) packet, the packet analysis circuit 41 outputs an Ack detection signal to the priority switching circuit 42. When detecting that the received packet is a CS packet, the packet analysis circuit 41 outputs a CS detection signal to the priority switching circuit 42.

The priority switching circuit 42 is supplied with various detection signals from the packet analysis circuit 41 and is also supplied with a Sub gap detection signal, which indicates that sub-action (Sub) gap is detected, from the gap detection circuit 43. The priority switching circuit 42 sets a switching flag CF for switching an Iso request IR output from the Iso request holding circuit 36 to an A-Stream request ASR based on an input detection signal and outputs the switching flag CF to the AND circuits 46 and 47. For example, when switching the Iso request IR to the A-Stream request ASR, the priority switching circuit 42 sets the switching flag CF to "0". When the priority switching circuit 42 does not switch the Iso request IR to the A-Stream request ASR, the circuit 42 sets the switching flag CF to "1". The priority switching circuit 42 generates a switching signal PS for changing an arbitration priority level for an A-Stream packet based on an input detection signal and outputs the switching signal PS to the selection circuit 44.

When the gap detection circuit 43 detects the lapse of an acknowledge gap from the input of an idle detection signal supplied from the arbitration control circuit 32, the circuit 43 outputs an Ack gap detection signal to the selection circuit 44. When detecting the lapse of an Iso gap from the reception of a CS packet, the gap detection circuit 43 outputs an Iso gap detection signal to the AND circuit 46. When detecting the lapse of a Sub gap which is longer than those of the Ack gap and the Iso gap, the gap detection circuit 43 outputs a Sub gap detection signal to the selection circuit 44 and the priority switching circuit 42.

The selection circuit 44 selects either of the Ack gap detection signal and the Sub gap detection signal in accordance with a switching signal PS from the priority switching circuit 42 and outputs the selected signal to the AND circuit 47. For example, the selection circuit 44 selects the Ack gap detection signal in response to a switching signal PS at a high level and outputs the selected signal to the AND circuit 47. The selection circuit 44 selects the Sub gap detection signal in response to a switching signal PS at a low level and outputs the selected signal to the AND circuit 47.

In IEEE Std 1394-1995 Standard or IEEE Std 1394a-2000 Standard, an arbitration priority level assigned to a packet is determined based on a bus idle time detected on a request output side. For example, when the arbitration priority is high, a request is transmitted after a short idle time, e.g., an Ack gap or Iso gap. When the arbitration priority is low, a request is transmitted after a long idle time, e.g., a Sub gap. Since a node assigned high priority outputs a request, the node may acquire a bus use right. When the Ack gap is selected based on the high-level switching signal PS, or when the Sub gap is selected based on the low-level switching signal PS, the arbitration priority levels are switched. The idle time of the Ack gap may be substantially the same as that of the Iso gap. The priority of the Ack gap may be substantially the same as that of the Iso gap. The Ack gap and the Iso gap may be selected according to whether it is during an Iso cycle or not, for example, whether a CS packet is received or not. In the above-described standard, the arbitration priority of each of the Iso packet and the Ack packet may be set to a high level and that of each the Asyn packet and the A-Stream packet may be set to a low level.

The counter 45 starts a counting operation based on the transmission of an A-Stream packet and counts a certain time, for example, a certain cycle. The counter 45 outputs an low-level count signal, for example, a count result to the AND circuit 47 until the certain time is elapsed and outputs an high-level count signal during the time period between the time when the certain time is elapsed and the time when the next A-Stream packet is transmitted. The certain time may be set to 125 µs is that is substantially the same as the Iso cycle, for example.

The AND circuit 46 is supplied with the Iso request IR from the Iso request holding circuit 36, the Iso gap detection signal from the gap detection circuit 43, and the switching flag CF from the priority switching circuit 42. When the Iso gap detection signal is supplied while the switching flag CF is set to "1", the AND circuit 46 outputs the Iso request IR to the arbitration control circuit 32. When a bus use right is acquired based on the Iso request IR, the transfer of consecutive data blocks in Iso packets is started. When the consecutive data blocks are transferred as Iso packets, CS packets are used.

A non-inverting terminal of the AND circuit 47 is supplied with the Iso request IR from the Iso request holding circuit 36, a detection signal from the selection circuit 44, and a count signal from the counter 45 and an inverting terminal thereof is supplied with the switching flag CF from the priority switching circuit 42. When the detection signal and a high-level count signal are supplied while the switching flag CF is set to "0", the AND circuit 47 switches the Iso request IR to the A-Stream request ASR and outputs the A-Stream request ASR to the arbitration control circuit 32. When the bus use right is acquired based on the A-Stream request ASR, the transfer of consecutive data blocks using A-Stream packets is started. Since the A-Stream request ASR is output when the Ack gap, which may not require reception of a CS packet or the Sub gap, is detected, the transfer of A-Stream packets may be started even when a CS packet is not received. When the Ack gap having high priority is selected based on the high-level switching signal PS, the arbitration priority for the A-Stream packets is higher than that of other Asyn packets (Priority=High). The A-Stream request ASR is output every 125 µs is based on a high-level count signal supplied every 125 µs is from the counter 45. A consecutive data block is transferred every certain cycle without using any CS packet. When the Sub gap having low priority is selected based on the low-level switching signal PS, the priority of the A-stream packet may be substantially the same as that of a normal Asyn packet as is conventionally done (Priority=normal).

FIG. 7 illustrates an exemplary method of switching. The priority switching circuit 42 may perform the switching illustrated in FIG. 7. In an operation S1, the node is hardware-reset. In an operation S2, the priority switching circuit 42 sets the switching flag CF to "0", generates a low-level switching signal PS, and initializes a timer (not illustrated) included in the priority switching circuit 42. When a bus reset is detected (YES in an operation S3), the priority switching circuit 42 again sets the switching flag CF to "0", generates a low-level switching signal PS, and initializes the timer in an operation S4. The process proceeds to an operation S5. When a bus reset is not detected (NO in the operation S3), the process proceeds to operation S5.

When the timer indicates 1 ms or shorter in operation S5, the priority switching circuit 42 determines in an operation S6 whether a CS packet is transferred, for example, whether a CS detection signal is input from the packet analysis circuit 41. When the CS detection signal is not input (NO in the operation S6) and the switching flag CF is set to "0" (NO in an operation S7), the priority switching circuit 42 determines in an operation S8 whether an Asyn packet is transferred, for example, whether an Asyn detection signal is input. When the Asyn detection signal is not input (No in the operation S8), the priority switching circuit 42 generates a high-level switching signal PS in an operation S9. Since the switching flag CF is set to "0" and the Ack gap having high priority is selected in response to the high-level switching signal PS, the arbitration priority of A-Stream packets is set to higher than that of normal Asyn packets (Priority=High). When a high-level count signal is output from the counter 45, the Iso request IR input to the AND circuit 47 is switched to the A-Stream request ASR having high priority and the A-Stream request ASR is output to the arbitration control circuit 32. Consecutive data blocks to be transferred as Iso packets are transferred using A-Stream packets having higher arbitration priority than that of Asyn packets.

The process returns to the operation S3. Such a high-priority state (Priority=High) is held until a bus reset is detected or a CS detection signal or Asyn detection signal is input.

When the reception of a CS packet is detected in the operation S6, the priority switching circuit 42 initializes the timer in an operation S10. In addition, the priority switching circuit 42 sets the switching flag CF to "1" in an operation S11 and generates a high-level switching signal PS. Since the Sub gap having low priority is selected based on the low-level switching signal PS, the arbitration priority of the A-Stream packets becomes substantially the same as that of the Asyn packets (Priority=normal). Since the switching flag CF is set to "1", the Iso request IR is output to the arbitration control circuit 32 without being switched to the A-Stream request ASR.

When the reception of the CS packet is detected in the operation S6 and the stop of transfer of CS packets is detected, the arbitration priority of the A-Stream packets is set to high. For example, after performing the operation S11, when a bus reset is not detected in the operation S3 and the time counted by the timer in operation S10 is 1 ms or less, the priority switching circuit 42 again determines in the operation S6 whether a CS packet is transferred. When any CS packet is not transferred (NO in the operation S6), operation S11 is performed again because the switching flag CF is set to "1" in the operation S11 (YES in the operation S7). The process returns to operation S3. The above-described process is repeated. When the time counted by the timer exceeds 1 ms (YES in the operation S5), the priority switching circuit 42 sets the switching flag CF to "0" in an operation S12. When the reception of any CS packet is not detected (NO in the operation S6) and the reception of any Asyn packet is not detected (NO in the operation S8), the priority switching circuit 42 generates a high-level switching signal PS in the operation S9. Since the switching flag CF is set to "0" and the high-level switching signal PS is generated, the Iso request IR output from the Iso request holding circuit 36 is switched to the A-Stream request ASR having high priority. When the reception of the next CS packet is not detected within a certain time from the time when the reception of the CS packet is detected, for example, within 1 ms, it may be determined that the transfer of CS packets is stopped and the priority of A-Stream packets may be set to a high level. The certain time for determination as to whether the transfer of CS packets is stopped may be longer than, for example, 125 µs that corresponds to the Iso cycle.

Figure 8A:
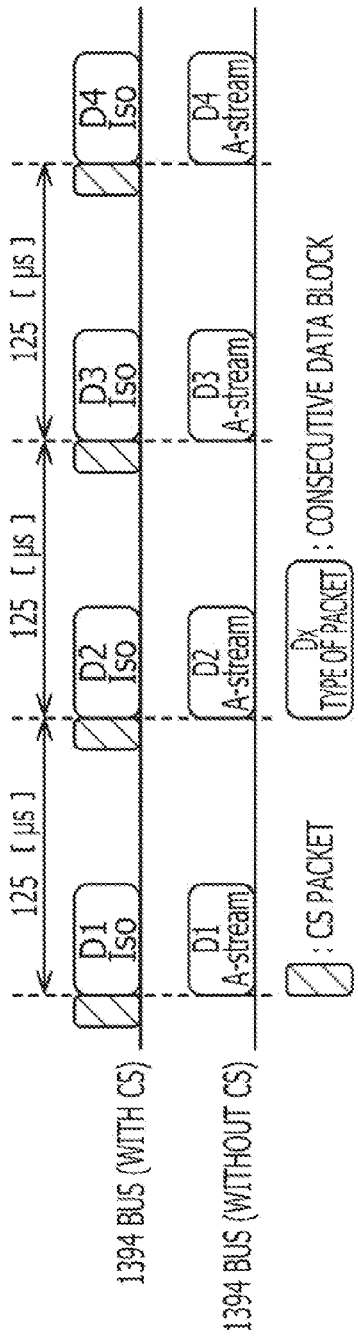
FIGS. 8A and 8B illustrate an exemplary method of transmission.
Figure 8B:
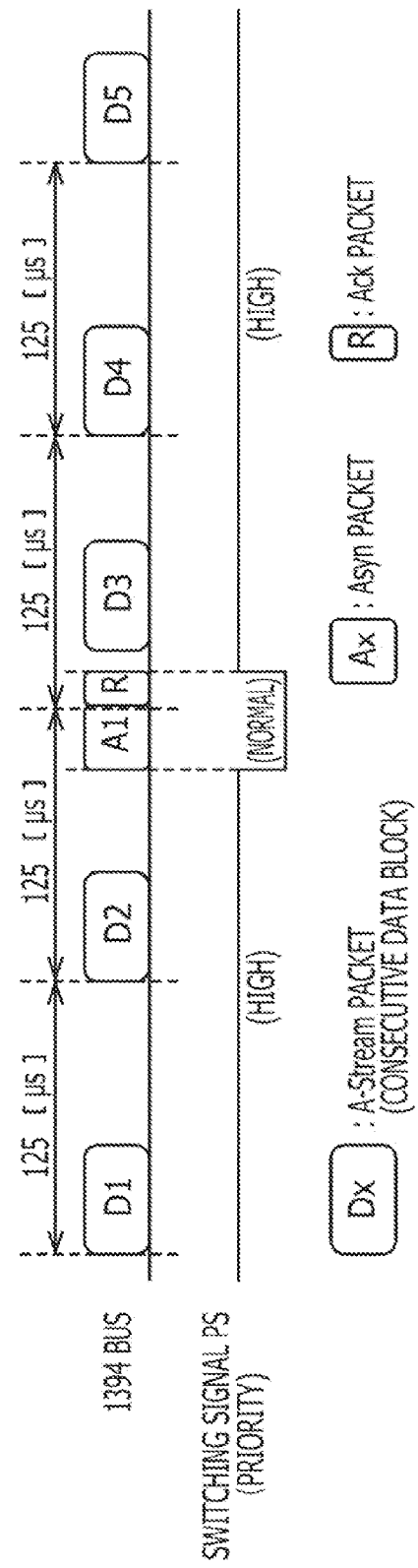

FIGS. 8A and 8B illustrate an exemplary method of transmission. In FIGS. 8A and 8B, consecutive data blocks, such as video data or audio data, are transmitted. The axis of ordinates and the axis of abscissas in FIGS. 8A and 8B are properly enlarged or reduced.

A node which will transmit consecutive data blocks using Iso packets secures an isochronous channel number (channel number) and a band for transfer of the Iso packets prior to data transmission. For example, an isochronous resource manager allocates a channel number and a band to the node which will transmit the Iso packets. The band may be allocated so that a maximum band is set to 4/5 of a band (8 kHz) corresponding to 125 µs which corresponds to an Iso cycle, for example.

Referring to FIG. 8A, when a CS packet is transferred, the switching flag CF is set to "1" (refer to the operations S6, S10, and S11). Accordingly, the Iso request IR input to the request generation circuit 40 is output to the arbitration control circuit 32. The consecutive data blocks D1 to D4 are transferred using Iso packets.

When any CS packet is not transferred, the switching flag CF is set to "0" until an Asyn packet is transferred, and a high-level switching signal PS is generated (see the operations S2 to S9). Upon transfer of an Iso packet, when the Iso request IR is output from the link layer, the Iso request IR is switched to the A-Stream request ASR having high priority. As for the node which is allocated the band and intends to transfer the Iso packets, when receiving no CS packet and detecting a detectable Ack gap, the node generates the A-Stream request ASR and starts arbitration. The arbitration is started without reception of a CS packet. The Ack gap may be shorter in time than the Sub gap. Priority may be assigned not to a node which detects the Sub gap and then starts Asyn transfer, for example, asynchronous arbitration but to a node which outputs the A-Stream request ASR. The node which outputs the A-Stream request ASR may assign higher priority to A-Stream packets than Asyn packets and transfer the A-Stream packets. When the node which has output the A-Stream request ASR acquires a bus use right in the arbitration in response to the A-Stream request ASR, the node uses the secured channel number and transfers the consecutive data block D1 using an A-Stream packet.

After a lapse of, for example, 125 µs from the time when the A-Stream packet is transferred, a high-level count signal is output from the counter 45, so that the A-Stream request ASR having high priority is again generated. When the bus use right is acquired in response to the A-Stream request ASR, the consecutive data block D2 following the consecutive data block D1 is transferred as an A-Stream packet. As for the transfer of A-Stream packets, since the arbitration priority is raised due to another Asyn packet every certain cycle, for example, 125 µs is, the bus use right is surely acquired at time points at regular intervals of 125 µs is. The consecutive data blocks D1 to D4 are transferred using A-Stream packets at certain time intervals. An Asyn packet may be transferred during a vacant time during which any A-stream packet is not transferred. Since an A-Stream packet is transferred using the previously allocated band, an A-Stream packet is transferred by the node allocated the band and the band for transfer of another Asyn packet is then secured. The other Asyn packet is transferred while the transfer of an A-Stream packet is reduced.

Upon transfer of an Asyn packet, when a node corresponding to a transfer destination address receives the Asyn packet, the node returns a return code for reception confirmation and an Ack packet to the node serving as the transfer source. The Ack gap may exist between the Asyn packet and the Ack packet. For example, after a lapse of the Ack gap from the time when the Asyn packet is transferred, arbitration for the transfer of the Ack packet is started. For example, when an Asyn packet is transferred prior to the transfer of an A-Stream packet and the transfer of an Ack packet associated with the Asyn packet overlaps the transfer of the A-Stream packet as illustrated in FIG. 8B, the Ack packet may not be transferred. For example, when the arbitration priority of the A-Stream packet is high, the A-Stream packet and the Ack packet are arbitrated fairly. Accordingly, the Ack packet may not be transferred.

For example, as illustrated in FIG. 7, when the reception of the Asyn packet is detected (YES in the operation S8), the priority switching circuit 42 generates a low-level switching signal PS in the operation S13 to reduce the arbitration priority of the A-Stream packet. For example, the arbitration priority of the A-Stream packet is set to substantially the same as that of another Asyn packet. When the Ack packet is transferred, the arbitration priority of the A-Stream packet is lower than that of the Ack packet. Thus, the bus use right is acquired to transfer the Ack packet. As illustrated in FIG. 8B, while the consecutive data blocks D1 to D4 are transferred using A-Stream packets, the Ack packet is transferred.

When the reception of the Ack packet is detected, or when the Sub gap is detected in an operation S14, the priority switching circuit 42 generates a high-level switching signal PS in the operation S9. The Sub gap may be detected in order to detect that any Ack packet is not transferred. For example, when the Sub gap, which is longer than the Ack gap, is detected, it may be determined that any Ack packet will not be transferred thereafter. After the Ack packet is transferred, for example, when it is determined that any Ack packet will not be transferred, the priority of the A-Stream packet is again raised and the A-Stream packet is transferred.

When any CS packet is not detected, the request generation circuit 40 generates the A-Stream request ASR instead of the Iso request IR. The A-Stream request ASR may be generated at a time other than the Iso cycle. Accordingly, an Iso packet and an A-Stream packet may not exist within the same Iso cycle. When a CS packet is detected, the request generation circuit 40 does not generate the A-Stream request ASR and uses the Iso request IR.

The request generation circuit 40 sets the arbitration priority of the A-Stream packet to be lower than that of the Ack packet during the period from the time when an Asyn packet is received to the time when the Ack packet is received, alternatively, during the period from the time when the Asyn packet is received to the time when the Sub gap is detected. The Ack packet is transferred preferentially over the A-Stream packet.

Consecutive data blocks are transferred using standard A-Stream packets. The data format of A-Stream packets may be substantially the same as that of Iso packets. Accordingly, when a reception side node includes a known IPC, transmission and reception of consecutive data blocks may be performed. The reception side node may not distinguish between the Iso packet and the A-Stream packet.

Since a process sequence of the request generation circuit 40 is executed in the physical layer, for example, the physical layer control circuit 30 illustrated in FIG. 3, the process sequence may not be mounted on a higher-level system, for example, the link layer or the application layer.

FIG. 9 illustrates an exemplary IEEE 1394 protocol controller. In FIG. 9, substantially the same elements as those in FIGS. 1 to 8B are designated by the same reference numerals and explanation thereof may be reduced or omitted.

The IPC 60 illustrated in FIG. 9 may conform to IEEE Std 1394b Standard. The IPC 60 in FIG. 9 includes a request generation circuit 90. The other elements may be substantially the same as or similar to those in FIG. 3.

In IEEE Std 1394b Standard, arbitration priority may be determined depending on the type of a bus request, for example, a code. Switching between arbitration priority levels may be different from that illustrated in the FIGS. 1 to 7. The request generation circuit 90 in FIG. 9 may differ from the request generation circuit 40 in FIG. 3. Each of port circuits 70a and 70b, a packet transmission/reception control circuit 81 in a physical layer control circuit 80, an arbitration control circuit 82, a S/P conversion circuit 83, a P/S conversion circuit 84, a port control circuit 85, and an Iso request holding circuit 86 may be a known circuit.

In IEEE Std 1394b Standard, a bus cable may correspond to full-duplex communication, for example, a cable may include two lines. When IEEE Std 1394b Standard is used as a communication format, input and output of communication data may be contemporaneously performed. For example, a bus request may be transmitted during data transfer.

Referring to FIG. 9, the request generation circuit 90 includes a packet analysis circuit 91, a priority switching circuit 92, a counter 93, and AND circuits 94 to 96. The request generation circuit 90 outputs either one of an Iso request IR, an asynchronous (Asyn) request AR, and a legacy (Legacy) request LR to the arbitration control circuit 82. Arbitration priority assigned to the Iso request IR is higher than that assigned to the Asyn request AR (NEXT_ODD or NEXT_EVEN). Arbitration priority assigned to the Legacy request LR is higher than that assigned to the Iso request IR. The Iso request IR, the Asyn request AR, and the Legacy request LR may be bus requests generated when consecutive data blocks are transferred. The Iso request IR may be a bus request which is generated after a CS packet is received. Each of the Asyn request AR and the Legacy request LR may be a bus request which is generated, irrespective of the reception of a CS packet.

The packet analysis circuit 91 analyzes a received packet from the S/P conversion circuit 83 in a manner similar to the packet analysis circuit 41, and outputs an Asyn detection signal, an Ack detection signal, or a CS detection signal to the priority switching circuit 92 in accordance with the analysis result.

The priority switching circuit 92 may perform substantially the same switching operation as the priority switching operation illustrated in FIG. 7. The priority switching circuit 92 sets the switching flag CF to "0" based on an input detection signal to generate the Asyn request AR or the Legacy request LR instead of the Iso request IR. The priority switching circuit 92 sets the switching flag CF to "1" to use the Iso request IR. When the priority switching circuit 92 does not receive a CS detection signal, the circuit 92 sets the switching flag CF to "0". When receiving a CS detection signal, the priority switching circuit 92 sets the switching flag CF to "1". When the priority switching circuit 92 does not receive the next CS detection signal within a certain time after the reception of the CS detection signal, the circuit 92 sets the switching flag CF to "0". The priority switching circuit 92 outputs the switching flag CF to the AND circuits 94 to 96.

The priority switching circuit 92 generates a switching signal PS for switching priority levels of the bus requests based on an input detection signal and outputs the switching signal PS to the AND circuits 95 and 96. When the switching flag CF indicates "0", the priority switching circuit 92 generates a low-level switching signal PS for selection of the Asyn request AR having low priority. The priority switching circuit 92 generates the low-level switching signal PS during the period from the time when the Asyn detection signal is input to the time when the Ack detection signal is input, alternatively, until the absence of an Ack packet is detected. In other cases, the priority switching circuit 92 generates a high-level switching signal PS for selecting the Legacy request LR having high priority.

The counter 93 starts a counting operation upon transmission of an A-Stream packet, outputs a low-level count signal to the AND circuits 95 and 96 until a certain time is elapsed, and outputs a high-level count signal to the AND circuits 95 and 96 after the lapse of the certain time. The certain time may be 125 μs is that is substantially the same as the Iso cycle, for example.

The AND circuit 94 is supplied with the Iso request IR from the link layer through an interface circuit 100 and the Iso request holding circuit 86 and is also supplied with the switching flag CF from the priority switching circuit 92. When the switching flag CF indicates "1", the AND circuit 94 outputs the Iso request IR to the arbitration control circuit 82. When a bus use right is acquired based on the Iso request IR, the transfer of consecutive data blocks using Iso packets is started.

A non-inverting terminal of the AND circuit 95 is supplied with the Asyn request AR and the count signal from the counter 93 and an inverting terminal thereof is supplied with the switching flag CF and the switching signal PS from the priority switching circuit 92. When the switching flag CF is set to "0", the low-level switching signal PS is supplied to the AND circuit 95, and the high-level count signal is supplied to the AND circuit 95, the AND circuit 95 outputs the Asyn request AR to the arbitration control circuit 82. When the bus use right is acquired based on the Asyn request AR, the transfer of consecutive data blocks using A-Stream packets is started. Arbitration priority assigned to the A-Stream packets may be substantially the same as that assigned to other Asyn packets (Priority=normal).

A non-inverting terminal of the AND circuit 96 is supplied with the Legacy request LR, the switching signal PS from the priority switching circuit 92, and the count signal from the counter 93 and an inverting terminal thereof is supplied with the switching flag CF from the priority switching circuit 92. When the switching flag CF indicates "0", the high-level switching signal PS is input to the AND circuit 96, and the high-level count signal is input to the AND circuit 96, the AND circuit 96 outputs the Legacy request LR to the arbitration control circuit 82. When the bus use right is acquired based on the Legacy request LR, the transfer of consecutive data blocks using A-Stream packets is started. Since the Legacy request LR is generated irrespective of the reception of a CS packet, the consecutive data blocks are transferred without using CS packets. Since the priority of the Legacy request LR is higher than that of the Asyn request AR, the arbitration priority assigned to A-Stream packets is higher than that assigned to other Asyn packets (Priority=High). The AND circuit 96 outputs the Legacy request LR every certain period, for example, 125 μs is. Accordingly, a consecutive data block is transferred every certain period without using any CS packet. The arbitration priority of A-Stream packets is set to substantially the same as that of Asyn packets during the period from the time when the reception of an Asyn packet is detected to the time when the reception of an Ack packet is detected. The arbitration priority of A-Stream packets may be set to lower than that of Ack packets. The arbitration priority of A-Stream packets may be higher or lower than that of Asyn packets.

Since the arbitration priority of A-Stream packets is set to substantially the same as that of Ack packets, the arbitration priority of A-Stream packets may be set to higher than that of Asyn packets. The arbitration priority of A-Stream packets may be set to higher than that of Asyn packets. Accordingly, the arbitration priority of A-Stream packets may not be the same as that of Ack packets. For example, the arbitration priority of A-Stream packets may be set to higher than that of Asyn packets and lower than that of Ack packets. If the transfer of an A-Stream packet overlaps the transfer of an Ack packet, for example, when a consecutive data block is transferred using the A-Stream packet, the Ack packet is transferred. The operation S13 or S14 in FIG. 7 may be omitted.

The certain time counted by the counter 45 or 93 may be set to an arbitrary time. The time counted by the timer in the operation S5 in FIG. 7 may be set to an arbitrary time for detecting that the transfer of a CS packet is stopped.

In the operation S2 or S4 in FIG. 7, the priority of A-Stream packets may be set to higher than that of Asyn packets.

The priority switching circuit 42 and 92 may not generate the switching flag CF. In this case, the operation S5, S6, S7, S10, or S12 in FIG. 7 may be omitted. Setting the switching flag CF and initializing the timer in the operations S2 and S4 in FIG. 7 may be omitted.

Each of the IPCs 10 and 60 may include three or more port circuits. The number of nodes in the network may be arbitrary.

Each of the nodes A to C may include an apparatus that conforms to IEEE 1394 Standards, for example, an apparatus that conforms to IDB-1394 Standard in which a consecutive data block is transferred every, for example, certain period.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A method of data transmission, comprising:
    transmitting data in a synchronous packet based on a first request signal for transmitting data in the synchronous packet;
    transmitting data in a first asynchronous packet based on a second request signal for transmitting data in the first asynchronous packet, the first asynchronous packet having a first priority of an arbitration for acquiring a bus use right;
    transmitting data in a second asynchronous packet based on a third request signal that is generated based on the first request signal, the second asynchronous packet having a second priority of the arbitration for acquiring the bus use right, the second priority being higher than the first priority; and
    generating the third request signal in a certain cycle.

2. The method according to claim 1, further comprising:
    transmitting the data using the second asynchronous packet when synchronization data indicating start of a synchronous transfer of the synchronous packet is not detected.

3. The method according to claim 1, further comprising:
    setting the priority of the second asynchronous packet to lower than that of a response packet corresponding to the first asynchronous packet during a time period between reception of the first asynchronous packet and reception of the response packet or during a time period between reception of the first asynchronous packet and a determination that the response packet is not transmitted.

4. The method according to claim 1, wherein the certain cycle corresponds to a period of time corresponding to a synchronous transfer time for transmission of the synchronous packet.

5. The method according to claim 4, further comprising:
allocating a band corresponding to a time period within a synchronous transfer time period to a node for transferring the synchronous packet prior to data transmission; and
transmitting the data using the second asynchronous packet through the band.

6. The method according to claim 1, wherein the certain cycle is counted at a node which transmits the second asynchronous packet.

7. A data transmitting apparatus comprising:
an interface circuit to receive a first request signal for transmitting data in a synchronous packet and a second request signal for transmitting data in a first asynchronous packet, the first asynchronous packet having a first priority of an arbitration for acquiring a bus use right; and
a request generation circuit to generate a third request signal for transmitting data in a second asynchronous packet based on the first request signal, to provide the second asynchronous packet with a second priority of the arbitration for acquiring the bus use right, the second priority being higher than the first priority, and to generate the third request signal in a certain cycle.

8. The data transmitting apparatus according to claim 7, wherein transmission of the second asynchronous packet is requested in the certain cycle.

9. The data transmitting apparatus according to claim 7, wherein the request generation circuit includes a first detection circuit to detect reception of synchronization data indicating start of a synchronous transfer of the synchronous packet, and generates the third request signal to request the transmission of the second asynchronous packet when the reception of the synchronization data is not detected.

10. The data transmitting apparatus according to claim 7, wherein the request generation circuit includes:
a second detection circuit to detect reception of the first asynchronous packet;
a third detection circuit to detect reception of a response packet corresponding to the first asynchronous packet; and
a priority switching circuit to set the priority of the second asynchronous packet to lower than that of the response packet during a time period between reception of the first asynchronous packet and reception of the response packet.

11. The data transmitting apparatus according to claim 10, wherein the request generation circuit further includes a fourth detection circuit to detect a lapse of a certain time from the reception of the first asynchronous packet, and wherein the priority switching circuit sets the priority of the second asynchronous packet to lower than that of the response packet until the certain time period from the reception of the first asynchronous packet lapses.

12. The data transmitting apparatus according to claim 11, wherein the request generation circuit includes a counter to count the certain cycle, and generates the third request signal for requesting the transmission of the second asynchronous packet in the certain cycle based on a counting result.

13. A network system including a plurality of nodes coupled via bus cables, at least one of the plurality of nodes comprising:
an interface circuit to receive a first request signal for transmitting data in a synchronous packet and a second request signal for transmitting data in a first asynchronous packet, the first asynchronous packet having a first priority of an arbitration for acquiring a bus use right; and
a request generation circuit to generate a third request signal for transmitting data in a second asynchronous packet based on the first request signal, to provide the second asynchronous packet with a second priority of the arbitration for acquiring the bus use right, the second priority being higher than the first priority, and to generate the third request signal in a certain cycle.

14. The network system according to claim 13, transmission of the second asynchronous packet is requested in the certain cycle.

* * * * *